Figure 1:
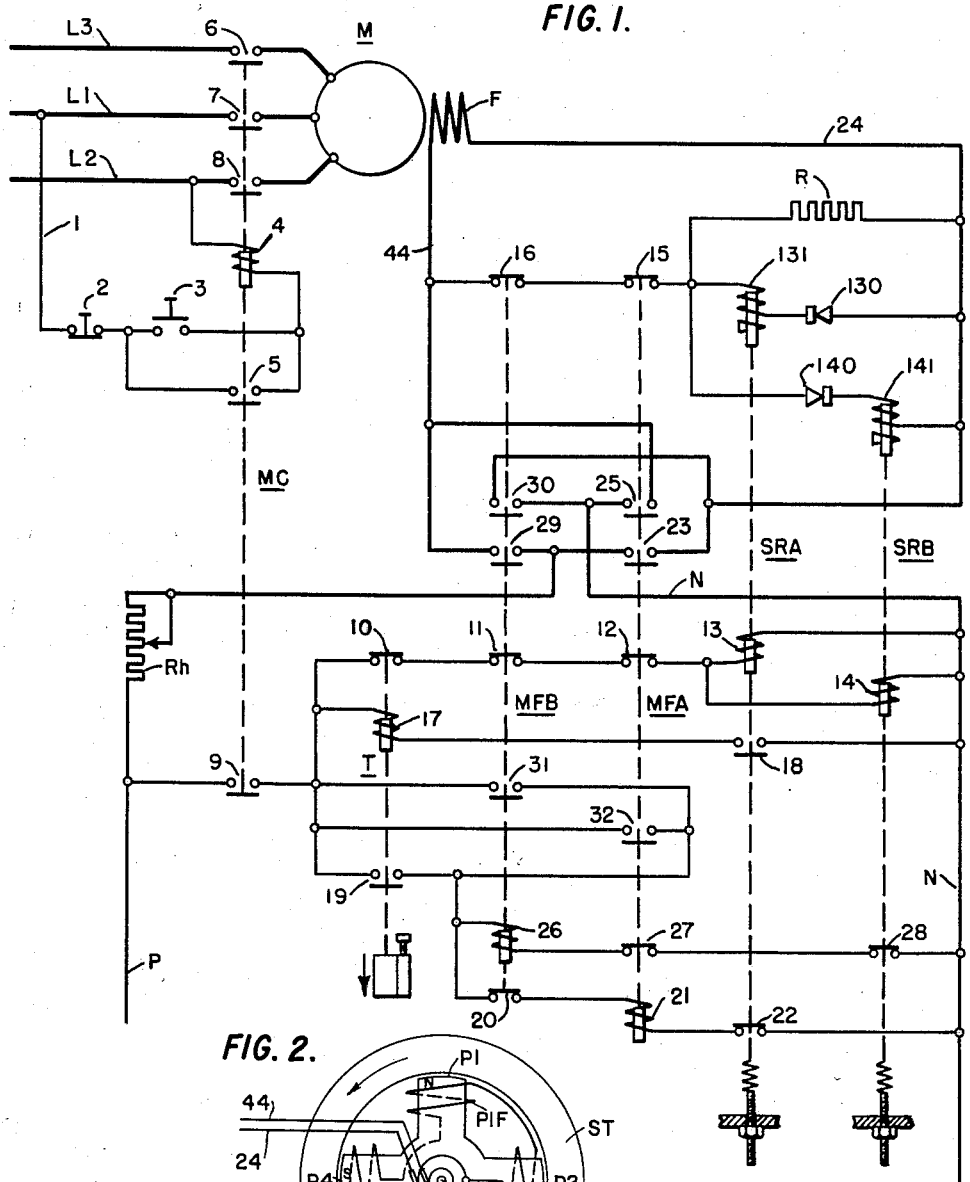

INVENTORS
William H. Dauberman and
Frank A. Woodbury

United States Patent Office 2,871,434
Patented Jan. 27, 1959

2,871,434

SELECTIVE POLARITY SYSTEM FOR FIELD APPLICATION OF SYNCHRONOUS MOTORS

William H. Dauberman, Fairview Park, and Frank A. Woodbury, Cleveland, Ohio, assignors to Westinghouse Electric Corporation, East Pittsburgh, Pa., a corporation of Pennsylvania Application June 21, 1955, Serial No. 516,942

6 Claims. (Cl. 318—175)

Our invention relates to motor control systems and more particularly to systems of control for effecting the starting and resynchronizing of synchronous motors.

One of the important problems in the starting of a synchronous motor is to effect synchronization with no, or at least a minimum, line disturbance, a minimum of shock to the load connected to the motor, and to effect maximum pull-in torque.

The broad problem hereinabove presented has been solved in various ways but the solutions have not proven entirely satisfactory especially for motors operating on the lower frequencies as 25 cycles and 15 cycles.

Because of the relatively high percent speed slip per cycle slip of motors operating on 25 cycles and lower frequencies, and because the motors with high torques synchronize on the reluctance of the motor, the prior art systems of control for starting synchronous motors are often not satisfactory. The motor field application is such as to make the starting unsuccessful.

To investigate the difficulty, we have taken many oscillograms on such 25 cycle synchronous motors. These oscillograms indicated that there is one critical half cycle of field application as the motor approaches synchronism. Due to variations of air and bearing friction, temperature, and voltage, the critical half cycle will not always be of the same polarity. If the excitation of the field by the system of control did not occur during this critical half cycle, then the motor would slip into step by its reluctance before the following half cycle had elapsed and by mere chance half of the times would lock in at 180 electrical degrees out of phase to the manner in which the excited field windings will try to synchronize the motor. If a field application system "looks" at just one polarity of induced currents in the field windings just prior to synchronization, say the positive half wave, this critical half cycle for field application may be a negative one and will not be measured by the field application relay.

Our investigations further revealed through the oscillograms that if the field application system is selected and adjusted to apply the direct current excitation to the field windings at a higher percent slip, at a lower R. P. M., then, to be sure, the field excitation would be applied before the motor locked itself in by virtue of its reluctance, but then the slip is so high that the motor can not accelerate fast enough to pull into step. In other words, it slips poles and will not synchronize. In fact, the safety equipment takes the motor off the line. One cycle slip on a 25 cycle motor is a 4% slip whereas a one cycle slip on a 60 cycle motor is only 1.7% slip. For motors of still lower frequency, the situation becomes progressively worse. This again shows that the synchronizing time is critical.

It is one specific object of our invention to provide a simple system of control that will continually "look" at the induced current in the field winding, both positive and negative polarities so that the system of control will excite the field windings with the right polarity very close to synchronous speed but just before the motor locks in by virtue of its own reluctance.

One broad object of our invention is to provide, in a simple control system, for maximum pull-in torque and minimum line disturbance for every starting of a synchronous motor.

Figure 2:
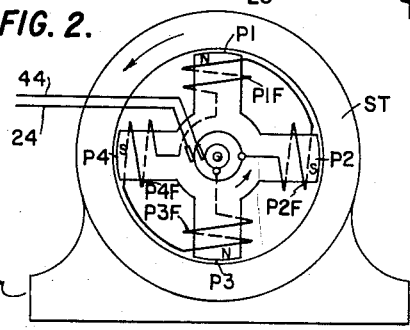

These two objects stated are merely illustrative. Still other objects and advantages will become more apparent from a study of the following specification when taken in conjunction with the accompanying drawing, in which:

Fig. 1 is a diagrammatic showing of our system of control for a synchronous motor; and Fig. 2 shows, somewhat schematically, the pole structure of a synchronous motor in relation to the stator of the synchronous motor.

We accomplish the solution of the problems stated by providing synchronizing relays as SRA and SRB, and rectifiers 130 and 140 associated with the coils for the relays, for detecting both positive and negative pulses, together with their duration, which are induced in the synchronous motor field windings by rotor slip. These detecting relays are then correlated with contacts and appropriate other relays such that when the rotor speed is sufficient for good synchronization, each field pole, as its magnetic field is established by direct current excitation, will be in line with a rotating stator field pole of opposite polarity. Field application contactors as MFA and MFB are provided so that any one field pole may be excited either as a north pole or as a south pole as determined by the detecting means.

The best understanding of our contribution to the art can probably be had from a study of the operation of our system of control. The operation of our system of control as shown in the drawings is as follows:

To start the synchronous motor M, the attendant actuates the start push button 3 whereupon a circuit is established from lead L1 through conductor 1, stop switch 2, start push button 3, actuating coil 4 of the main contactor MC to the lead L2. Operation of the main contactor MC effects the closing of contacts 5, 6, 7, 8, and 9. The closing of contacts 5 establishes a holding circuit for coil 4, the closing of contacts 6, 7, and 8 connects the motor armature A to the alternating current leads L1, L2, and L3, and the closing of contacts 9 establishes a circuit from the positive bus P through contacts 9 of the main contactor MC, contacts 10 of the time limit relay T, contacts 11 of the field contactor MFB, contacts 12 of the field contactor MFA, parallel connected actuating coils 13 and 14 for the synchronizing relays SRA and SRB, respectively, to the negative bus N.

Since the motor M is at standstill at the instant contacts 6, 7 and 8 close, it is apparent that an alternating current equal to line frequency will be induced in the field winding F. The frequency of this alternating current will, of course, diminish as the motor speeds up, but for the time being, an energized circuit will be established which circuit may be traced from the right-hand terminal of field winding F through the conductor 24, the field discharge resistor R and the back contacts 15 and 16 of the field contactors MFA and MFB, respectively, conductor 44, to the left-hand field terminal.

The synchronizing relays SRA and SRB are each provided with additional coils, such as coils 131 and 141, respectively. A rectifier 130 is connected in series with the coil 131 and an oppositely poled rectifier 140 is connected in series with coil 141. These two series circuits of coils and rectifiers are connected across the field discharge resistor R.

This means that synchronizing relay SRA is held in by the pulsating direct current flowing in coil 131 from right to left and the synchronizing relay SRB is held in by the pulsating direct current flowing in coil 141 from left to right. When coils 13 and 14 of these synchronizing relays were energized by the circuit for these coils above traced, the synchronizing relays were picked up but as soon as coils 131 and 141 become effective the relays are held in independently of coils 13 and 14. The utility of this becomes readily apparent when note is taken of the fact that the pick-up operation of relay SRA effects the closing of contacts 18 to thus establish a circuit from the positive bus P through contacts 9 of the main contactor MC, actuating coil 17 of the timing relay T and contacts 18 to the negative bus N. The timing relay picks up immediately to open contacts 10 and close contacts 19. The opening of contacts 10 effects deenergization of coils 13 and 14. The relays SRA and SRB are thus held in by coils 131 and 141, respectively.

As the synchronous motor speeds up, the pulses of direct current through coils 131 and 141 become slower and slower. Since the synchronizing relays SRA and SRB are selected to be alike in structure and function, the particular synchronizing relay first to be energized with the particular critical pulse, or half cycle, having the lowest voltage and for greatest delay between pulses will drop out first. If, for example, the particular critical half cycle produced in the field winding by the rotating magnetic field in the stator ST is the one when the induced current in the field winding flows from conductor 44 to conductor 24, then the polarities produced by the windings P1F, P2F, P3F, and P4F, on he salient poles P1, P2, P3, and P4, respectively, will be as indicated in Fig. 2. This ordinarily, but not necessarily, means that the connection of the field windings to the direct current supply terminals P and N should be so made that the polarities of the salient poles is not changed by the direct current excitation of the field windings. In this case the synchronizing relay SRA drops out first and then the contacts 22 are closed. This operation establishes a circuit from the positive bus P through contacts 9 and 19, back contacts 20 of the field contactor MFB, the actuating coil 21 of the field contactor MFA, contacts 22 of the synchronizing relay SRA, to the negative bus N. The particular field contactor energized is the one to provide proper synchronizing of the synchronous motor with maximum pull-in torque and provides magnetization of the field poles in such a way that north poles of the rotating field structure are opposite south rotating poles in the armature structure and south poles on the rotating field structure are opposite rotating north poles in the armature structure.

Energization of coil 21 causes the operation of field contactor MFA whereupon a circuit is established from the positive bus P through the field rheostat R$h$, contacts 23 of field contactor MFA, conductor 24, field winding F energized from right to left, conductor 44, and contacts 25 to the negative bus N.

Should it have happened that synchronizing relay SRB had dropped out first, then a circuit would have been established from the positive bus P through contacts 9 of the main contactor MC, contacts 19 of the timing relay T, actuating coil 26 of the field contactor MFB, back contacts 27 of the field contactor MFA, and contacts 28 of the frequency relay SRB to the negative bus N. Contactor MFB would have pulled in to establish a circuit from positive bus P through rheostat R$h$, contacts 29, conductor 44, field winding F, energized from left to right, conductor 24, and contacts 30 to the negative bus N.

As soon as the motor synchronizes, both synchronizing relays drop out, but since the field contactors are interlocked by the contacts 20 and 27, respectively, the particular field contactor that has been operated remains in operated position. Further, contacts 18 open to thus deenergize the timing relay. A selected time interval after synchronization of the motor, contacts 10 close and contacts 19 open. The opening of contacts 19 does not affect the operated position of the particular field contactor that has been operated. Field contactor MFA, should it be in operated position, holds itself in through contacts 32, whereas if field contactor MFB happens to be in operated position, it holds itself in through contacts 31.

The drop-out of the timing relay again sets up the circuitry for resynchronization.

From the foregoing it is apparent that we have provided a simple and reliable and relatively inexpensive means for effecting proper synchronization of a synchronous motor. However, we do not wish to be limited to the particular circuits shown but that other circuit arrangements for accomplishing the novel results fall within the scope and spirit of our invention.

We claim as our invention:

1. In a system of control for starting a synchronous motor, in combinations, a synchronous motor having a stator and having a field winding disposed on a plurality of poles disposed on the rotor structure of the motor, a pair of terminals energized with direct current, a pair of selectively operable synchronizing means, one of said means, being responsive to the frequency of the voltages of one polarity induced in the motor field winding during acceleration of the motor, effects the connection of the field winding to said terminals so that the odd poles are north and the even poles are south, the second of said means, being responsive to the frequency of the voltages of opposite polarity induced in the field winding during acceleration of the motor, effects the connection of the field winding to said terminals so that the odd poles are south and the even poles are north, said synchronizing means each including means responsive to the particular half cycle, of the voltage induced in the field winding during low slip of the motor as it accelerates, that has a duration longer than a selected value, whereby said synchronizing means are selectively operated depending on whether the particular half cycle is of said one polarity or of said opposite polarity.

2. In an electric system of control, in combination, a synchronous motor having a stator winding and having a field winding, a pair of terminals, energized with direct current, for energizing the field winding, switching means for selectively connecting the field winding to said terminals to energize the field winding so that the current flows through the field winding either in one direction or in an opposite direction depending on the selective operation of said switching means, and control means, including first means responsive to the particular positive half cycle, of the current induced in the motor field winding during low slip as the motor accelerates during starting, that has a longer duration than a selected time period, and second means responsive to the particular negative half cycle, of the current induced in the motor field winding during low slip as the motor accelerates during starting, that has a longer duration than the said selected time period, for effecting the selective operation of said switching means.

3. In a system of control for a synchronous motor, in combination, a synchronous motor having primary windings and having field windings, direct current terminals energized with direct current, first switching means, including means responsive to the positive half cycle, of the current induced in the field winding during low slip as the motor accelerates toward synchronous speed, having a selected duration, for connecting the field windings to said direct current terminals for energization in one direction and second switching means, including means responsive to the negative half cycle, of the current induced in the field winding during low slip as the motor accelerates toward synchronous speed, having a duration substantially equal to said selected duration, for connecting the field windings to said direct current terminals for energization in the opposite direction.

4. In a system of control for a synchronous motor, in combination, a synchronous motor having a stator winding and a salient pole rotor provided with field windings, a plurality of electrical terminals energized with alternating current, switching means for connecting the stator winding to said terminals to cause a rotating flux to rotate about the rotor whereby an alternating current is induced in the field windings, a pair of terminals energized with direct current, first switching means for connecting the field windings to said pair of terminals in such a manner that the field windings on the first group of alternate salient poles produce north poles facing the stator and the field windings on the second group of alternate salient poles produce south poles facing the stator and second switching means for connecting the field windings to said pair of terminals in such a manner that the field windings on the first group of alternate salient poles produce south poles facing the stator and the field windings on the second group of alternate salient poles produce north poles facing the stator, and relay means, responsive to the positive half cycle, of the current induced in the field winding during low slip as the motor accelerates toward synchronous speed, having a selected duration, for effecting the operation of the first switching means, and relay means, responsive to the negative half cycle, of the current induced in the field winding during low slip as the motor accelerates toward synchronous speed, having a duration substantially equal to said selected duration, for effecting the operation of the second switching means.

5. In a system of control for a synchronous motor, in combination, a synchronous motor having primary windings and having field windings, direct current terminals energized with direct current, first switching means for connecting the field windings to said direct current terminals to cause current to flow through the field windings in one direction and second switching means for connecting the field windings to said direct current terminals to cause current to flow through the field windings in a reverse direction, means responsive to a positive half cycle of the current induced in the field winding during low slip that has a duration of a selected time period, and means responsive to a negative half cycle of the current induced in the field winding during low slip that has a duration substantially equal to said selected time period, whereby the inherent non-symmetry of the two half cycles, the mentioned positive half cycle and the mentioned negative half cycle, causes selective operation of said first and second switching means.

6. In a system of control for a synchronous motor, in combination, a synchronous motor having a field winding and supply terminals therefor, first means for connecting the field winding to said supply terminals to cause current to flow through the field windings in one direction and second means for connecting the field winding to the supply terminals to cause current to flow through the field windings in a reverse direction and means responsive to a positive half cycle of the current induced in the field winding having a duration of a selected time period for effecting the operation of the first means, and means responsive to a negative half cycle of the current induced in the field winding having a duration equal to said selected time period for effecting the operation of the second means.

References Cited in the file of this patent

UNITED STATES PATENTS

| | | |
|---|---|---|
| 2,164,181 | Schoults | June 27, 1939 |
| 2,255,923 | Griscom | Sept. 16, 1941 |